No. 882,056. PATENTED MAR. 17, 1908.
R. FOLKERTS.
SCRAPER.
APPLICATION FILED AUG. 27, 1907.

Witnesses
Inventor
Ricklef Folkerts,
By Woodward & Chandlee
Attorneys

UNITED STATES PATENT OFFICE.

RICKLEF FOLKERTS, OF LAKEFIELD, MINNESOTA.

SCRAPER.

No. 882,056.　　　Specification of Letters Patent.　　　Patented March 17, 1908.

Application filed August 27, 1907. Serial No. 390,275.

*To all whom it may concern:*

Be it known that I, RICKLEF FOLKERTS, citizen of the United States, residing at Lakefield, in the county of Jackson and State of Minnesota, have invented certain new and useful Improvements in Scrapers, of which the following is a specification.

This invention relates to cultivators of the disk type, and more particularly to attachments therefor, and has for its object to provide a scraping attachment for disk cultivators which will be arranged to efficiently remove earth adhering to the disks and which will be arranged to automatically compensate for wear.

Other objects and advantages will be apparent from the following description and it will be understood that changes in the specific structure shown and described may be made within the scope of the claims without departing from the spirit of the invention.

Figure 1:
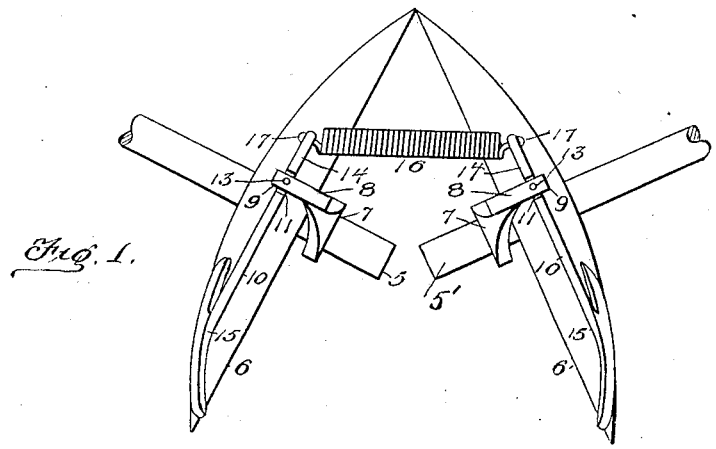
Figure 2:
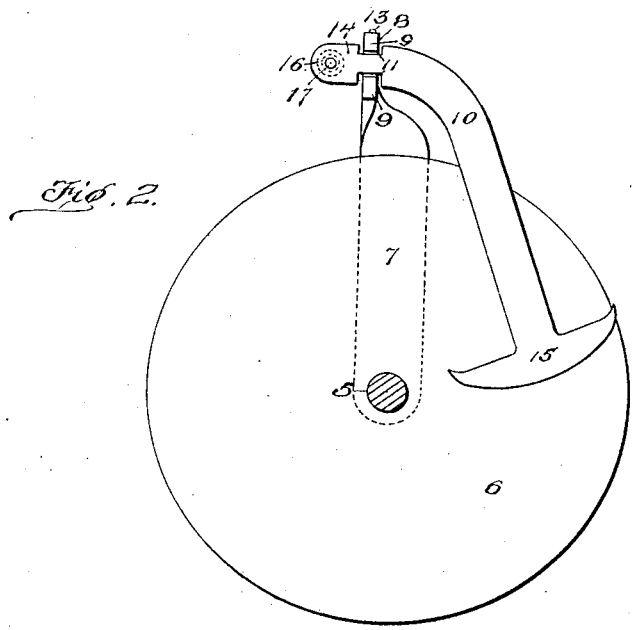

In the drawings forming a portion of this specification, and in which like numerals of reference indicate similar parts in the several views, Figure 1 is a top plan of a cultivator provided with the present invention; Fig. 2 is a side elevation.

Referring now to the drawings, there is shown a cultivator including rearward axles 5 and 5' upon which there are mounted a pair of rearwardly divergent disks, 6. A pair of uprights 7 are mounted upon the axles between the disks and have their upper portions turned laterally and given a quarter twist to bring them into vertical planes, as shown at 8, and these portions 8 have their outer edges cut away to form upper and lower spaced fingers 9, each of which is given a turn to bring it into a horizontal plane.

Scraper arms 10 are provided, each having their opposite edge portions cut away as shown at 11, adjacent to one end, to form a reduced neck 12, which is engaged between the fingers 9 of one of the uprights 7, a pivot pin 13 being engaged through the reduced neck and the fingers.

The scraper arms extend forwardly beyond the uprights, as shown at 14, and rearwardly of the uprights, the scraper arms are extended downwardly and outwardly over the outer or convex faces of the disks, where they are provided with scraping blades 15 which engage the convex faces of the disks.

It will be observed that the scraper arms are pivotally mounted so that the blades 15 may be moved into and out of engagement with the disks, and to hold the arms yieldably in engagement with the disks, a spring 16 is engaged between the forward portions of the arms and has its ends secured in openings 17 formed in the arms.

It is thought that the action of the scraper will be clearly understood without more definite description.

What is claimed is:

The combination with an agricultural implement including spaced disks and axles therefor, of supports carried by said axles and located between the disks, an arm pivoted to each support, said arms extending forwardly beyond the supports and extending rearwardly and downwardly over the convex faces of the disks, scraper blades carried by the rearward ends of the arms, said scraper blades extending transversely of the disks, and a spring engaged between the forward ends of the arms and arranged to hold the arms with their transversely extending blades yieldably in engagement with the disks.

In testimony whereof I affix my signature, in presence of two witnesses.

RICKLEF FOLKERTS.

Witnesses:
　A. J. NESTRUD,
　P. W. BLOCKEST.